United States Patent [19]

Casalino et al.

[11] Patent Number: 4,895,312

[45] Date of Patent: Jan. 23, 1990

[54] TAKE-UP MODULE FOR CONTINUOUS FILAMENTS

[75] Inventors: Pier G. Casalino; Carlo Sarasso; Mario Rossi, all of Vercelli, Italy

[73] Assignee: Industria Tessile Di Vercelli S.p.A., Milan, Italy

[21] Appl. No.: 221,862

[22] Filed: Jul. 20, 1988

[30] Foreign Application Priority Data

Jul. 29, 1987 [IT] Italy .................. 21492 A/87

[51] Int. Cl.$^4$ .................................. B65H 54/20
[52] U.S. Cl. ................................. 242/35.5 R
[58] Field of Search .................... 242/35.5 R

[56] References Cited

U.S. PATENT DOCUMENTS

| | | | |
|---|---|---|---|
| 3,235,192 | 2/1966 | Scragg | 242/35.5 R |
| 3,355,116 | 11/1967 | Conrad | 242/35.5 R X |
| 3,544,017 | 12/1970 | Schippers et al. | 242/35.5 R X |
| 3,565,355 | 2/1971 | Schippers et al. | 242/35.5 R X |
| 3,830,440 | 8/1974 | Bense | 242/35.5 R |
| 3,862,722 | 1/1975 | Pierce | 242/35.5 R |

Primary Examiner—Stanley N. Gilreath
Attorney, Agent, or Firm—Stevens, Davis, Miller & Mosher

[57] ABSTRACT

Take-up module for continuous filaments, and particularly for cellulose acetate filaments, comprising two take-up heads and, correspondingly, two filament tension regulators, wherein the axes of the take-up heads lie on two parallel and different planes, and the tension regulators are arranged on the same plane, which, however, is different from the planes of the axes of the take-up heads.

3 Claims, 1 Drawing Sheet

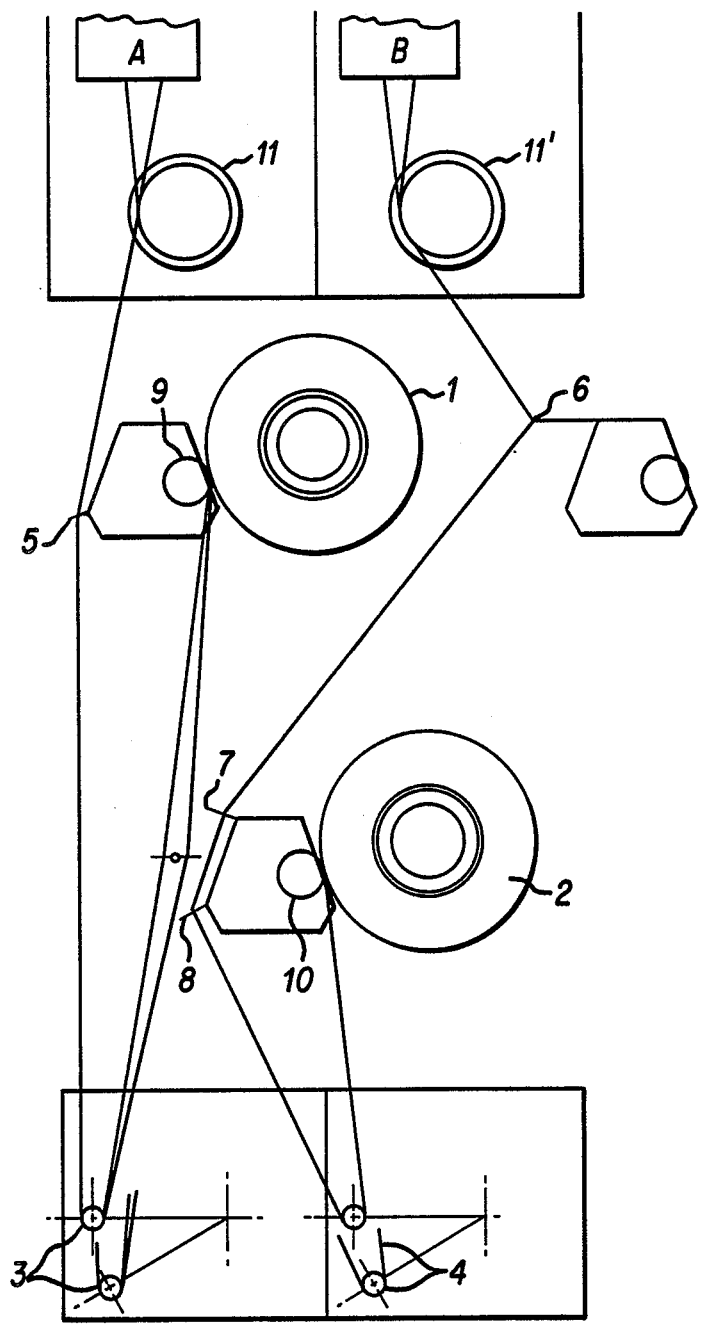

TAKE-UP MODULE FOR CONTINUOUS FILAMENTS

DESCRIPTION OF THE INVENTION

This invention relates to a take-up module for continuous filaments.

More particularly, the present invention relates to a take-up module for cellulose acetate continuous filaments.

As it is known, cellulose acetate continuous filaments, and more generally all the threads produced according to dry-spinning or melt-spinning technology, are wound on a tube when they leave the spinneret, after having undergone an optional sizing and/or other intermediate treatments.

It is known too that in order to increase the productivity of a spinning machine it is usual to increase the spinning speed or to produce a plurality of filaments in each spinning cell. The first choice is limited by the maximum speed that the usual take-up machines can reach while providing at the same time a perfect winding. The second choice is preferred because of economic reasons, generally involving the production of two parallel filaments coming from the same spinning cell or spinneret.

However, this choice is not entirely free from drawbacks especially as far as the take-up system is concerned.

In fact, the use of a plurality of take-up tubes on the same tube-holder involves in the first place a reduction of the weight of the obtainable windings. Furthermore, the filament quality is very often bad, due to the shorter stroke of the distribution thread guide, and the windings thus-obtained may be unstable. On the other hand, the arrangement of a plurality of take-up heads on the same horizontal or vertical plane is obviously hindered by the space available in the conventional production machines. In fact, the size of each take-up head is dependent on its various components, which, as it is known, comprise the take-up tube and the relevant control devices, which are interlocked and integral with each head.

In accordance with the present invention, it has been discovered as to the spinning machines having two filaments in each spinning cell, that by properly arranging the various parts which form the take-up module and by causing the filaments to run a particular path from the spinning cell to the take-up head, it is possible to considerably increase the productivity of the machine without encountering the above drawbacks.

An object of the present invention is a take-up module comprising two take-up heads and correspondingly two thread tension regulators, in which the axes of the take-up heads lie on different planes parallel with each other, and the thread tension regulators are arranged on the same plane, which however is different from those in which lie the axes of the take-up heads.

The threads coming from two adjacent spinning cells or spinnerets are fed two by two to the take-up heads through respective tension regulators, following different paths. In particular, the two threads of the first spinning cell are fed to the tension regulator and from this to the respective take-up head following a V-shaped path, at the apex of which the tension regulator is arranged. The two threads of the second cell, conversely, are made to pass between the two axes of the take-up heads, following a path having the shape of two consecutive "V's", wherein at the apex of the first "V" there is arranged a thread guide substantially lying in the same horizontal plane as the axis of the first take-up head, while at the apex of the second "V" the tension regulator lies in the same horizontal plane as that of the first tension regulator.

Each take-up head is equipped with two tubes, on each of which each individual filament is wound.

Because of the above described arrangement of the take-up heads and of the relevant tension control devices as well as of the particular paths followed by the two filaments when leaving the spinning cell and up to the take-up head, the module of the present invention takes up a space which substantially corresponds to that of one take-up head, wherefore it can be retrofitted to the usual and well-known spinning machines without any modification in their structure.

Furthermore, the two take-up heads are fully reciprocally independent without any interference during the manual start-up and maintenance operations.

The construction, structural and functional features of the present invention will become still better apparent from the following detailed description, in which reference is made to the single figure of the annexed drawing, which schematically illustrates a preferred exemplifying but not limitative embodiment of the present invention.

With reference to the figure, the take-up module for continuous filaments according to the present invention comprises two take-up tubes (1) and (2) and two tension regulators (3) and (4) of conventional type.

The axes of the take-up tubes (1) and (2) are parallel to each other and lie on parallel and different planes. Control mechanisms (3) and (4) are separated from the respective heads and are arranged on the same plane, which is different from those of the axes of the take-up tubes (1) and (2).

According to the preferred embodiment illustrated in the figure, the plane of the control mechanisms (3) and (4) underlies the planes of the axes of take-up tubes (1) and (2). Each take-up tube (1) and (2) is equipped with the relevant transverse mechanism (9) and (10) and with a thread guide holding slide, according to per se conventional technique. Control mechanisms (3) and (4) are not described in detail herein, as they are of a well known type. A set of thread guides (5), (6), (7) and (8) have the function of causing the filament to follow a particular path which does not hinder the free rotation of the bobbins, whatever the necessary diameter thereof may be.

In particular, the two filaments of spinning cell A coming from bucket (11) are made to pass through thread guide (5), tension regulator (3) and transverse mechanism (9) arranged so as to form a "V" with the tension regulator (3) at the apex. The two filaments of cell B follow, conversely, a path having the shape of two consecutive "V's, one being formed between bucket (11') and thread guides (6) and (7), the other being formed between thread guide (8), tension regulator (4) and transverse mechanism (10).

On each take-up tube (1) and (2), two tubes for the separate taking-up of the two filaments of each spinning cell A and B are provided.

The module according to the present invention comprises furthermore a suction device, a slitting machine etc., as is usual for such conventional take-up heads.

As is apparent from the figure, the take-up module of the present invention is very compact, takes up a space almost like the one which is taken up by a single take-up head, and permits one to collect the two filaments coming from the spinning cell at a high speed, independently of each other, while producing the usual windings.

What is claimed is:

1. Take-up module for continuous filaments, in particular for cellulose acetate filaments, comprising:
    a first take-up head equipped with a first and second take-up tube, each winding an individual thread;
    a second take-up head equipped with a third and fourth take-up tube, each winding an individual thread, the axes of said first and second take-up heads lying in different parallel planes;
    a first tension regulator along the path of a first pair of threads running between a first spinning cell and said first take-up head, said first tension regulator lying in a plane which differs from those in which the axes of the take-up heads lie;
    a second tension regulator along the path of a second pair of threads running between a second spinning cell and said second take-up head, said second tension regulator lying in the same plane as said first tension regulator;
    a first set of thread guides defining substantially a V-shape for said path of said first pair of threads, said first tension regulator being at the apex of said V-shape; and
    a second set of thread guides defining a shape substantially in the form of consecutive first and second V's for said path of said second pair of threads, with a thread guide and said second tension regulator, respectively, at the apexes of said first and said second V, said path of said second pair of threads passing between said axes of said first and second take-up heads.

2. A take-up module according to claim 1, wherein the plane of said first and second tension regulators underlies the planes of the axes of said first and second take-up heads.

3. A module according to claim 1 or 2, wherein said thread guide at the apex of said first V of said path of said second pair of threads leading from said second spinning cell lies in substantially the same horizontal plane as said axis of said first take-up head.

* * * * *